United States Patent
Velez et al.

(10) Patent No.: US 6,246,722 B1
(45) Date of Patent: Jun. 12, 2001

(54) METHOD OF DETECTION OF MISCONVERGENCE USING CONSTELLATION SCANNING IN AN EQUALIZER

(75) Inventors: Edgar Velez, Kanata; Ian Dublin, Ottawa, both of (CA); Richard Buz, Rohnert Park, CA (US); Sisay Yirga, Nepean (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/069,520

(22) Filed: Apr. 29, 1998

(51) Int. Cl.[7] .................................. H04L 5/12; H03H 7/30
(52) U.S. Cl. .............................................. 375/261; 375/229
(58) Field of Search ....................................... 375/261, 326, 375/327, 334, 235, 229, 231, 232, 233; 708/323, 322, 506

(56) References Cited

U.S. PATENT DOCUMENTS

| | | | |
|---|---|---|---|
| 5,363,408 | * 11/1994 | Paik et al. ............................. | 375/261 |
| 5,541,956 | 7/1996 | Ueda ..................................... | 375/232 |
| 5,689,528 | 11/1997 | Tsujimoto ............................. | 375/233 |
| 5,694,423 | 12/1997 | Larsson et al. ....................... | 375/231 |
| 5,717,721 | * 2/1998 | Kawai .................................. | 375/326 |
| 5,859,871 | * 1/1999 | Cook ................................... | 375/235 |
| 6,088,389 | * 7/2000 | Larsson ............................... | 375/231 |

* cited by examiner

*Primary Examiner*—Chi Pham
*Assistant Examiner*—Khai Tran
(74) *Attorney, Agent, or Firm*—Pearne & Gordon LLP

(57) ABSTRACT

A method of detecting misconvergence in an equalizer having a quadrature amplitude modulation (QAM) slicer having an index n. The method includes the steps of initializing a plurality of signal counters then processing random symbols (for example between 500 and 20000 symbols) through the equalizer where the symbols are quantized into an appropriate constellation point in an n-QAM constellation map, where each signal counter corresponds to a respective one of the constellation points in the constellation map. The signal counters are incremented when one of the symbols is quantized to the corresponding constellation point. After the signals have been processed into the constellation map the number of non-zero counters are detected. If the number of non-zero counters is less than a prescribed number (for example between approximately 0.5n and approximately 0.9n), then the equalizer has not converged and if the number of non-zero counters is equal to or greater than the prescribed number than the equalizer has converged.

15 Claims, 4 Drawing Sheets

METHOD OF DETECTION OF MISCONVERGENCE USING CONSTELLATION SCANNING IN AN EQUALIZER

FIELD OF THE INVENTION

This invention relates to the field of modem equalizers, and in particular to methods of detecting misconvergence in adaptive decision feedback equalizers.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. In a particular modulation transmission scheme, the phase and amplitude of a signal are shifted to various combinations of values, each combination indicating a different set of transmitted bits. At the receiver, proper decoding includes detecting the various phase and amplitude combinations. In a two dimensional modulation scheme, the signal can be represented mathematically with an I (in-phase) component and a Q (quadrature-phase) component of the signal, each of which is $\pi/20$ out of phase with respect to the other. The plot of these two components on a two dimensional graph for a set of received symbols results in a pattern referred to as a constellation.

Proper detection of the I and Q components of the signal is hampered by various sources of signal degradation. One such source is intersymbol interference where consecutive transmitted symbols interfere with each other. Other sources of signal degradation include the transmission media (i.e. wire) and analog filters. These factors produce large amplitude and group delay distortion in the signal that needs compensation.

To compensate for intersymbol interference (ISI) and other sources of signal degradation and distortion, best performance is achieved by implementing an equalizer as a fractionally spaced adaptive filter. An adaptive filter can modify from time instant to time instant, the coefficients, also referred to as tap weights, used in the filter to remove ISI and to compensate for amplitude and group delay distortions. The update of the tap weights is done to minimize the error at the output of the filter. This error is effectively a measure of the difference between the actual output of the filter and the expected output. The adaptive process continues until the error is at a minimum (i.e. the filter converges).

The convergence of an equalizer depends on many factors including initial tap weights, desired convergence rate, signal to noise ratio (SNR) at the input and phase changes caused by a clock recovery circuit at the receiver, and can be accomplished with various adaptive algorithms.

The adaptation of the tap weights in adaptive equalizers is based on an assumed correct decision about which symbol was received. This assumption is valid for equalizers with a training sequence for which the received symbol is in fact known in advance. Equalizers, however, are also used without the benefit of a training sequence, in which case the decision is not necessarily correct. These equalizers are referred to as blind equalizers. The term blind refers to trying to find the correct equalizer coefficients without a reference training sequence, therefore during convergence the decisions may be incorrect and the coefficients (weights) erroneously updated. Although the possibility of a mistake exists, if the blind equalizer makes correct decisions for a sufficiently large set of received symbols, the equalizer will converge correctly.

A common problem with equalization is the detection of misconvergence to ensure that the convergence algorithm has worked properly. In certain cases of pathological misconvergence (discussed in detail below) typical equalizer error measures used to detect misconvergence (such as average error from filter outputs) will be below acceptable thresholds yet the constellation map for a given QAM will not be formed correctly (i.e. in number of points and/or size).

SUMMARY OF THE INVENTION

An object of the present invention is to provide a method of improving the detection of misconvergence of an equalizer.

In accordance with an aspect of the present invention there is provided a method of detecting misconvergence in an equalizer having a quadrature amplitude modulation (QAM) slicer having an index n, comprising the steps of: (a) processing random symbols through the equalizer wherein the symbols are quantized into an appropriate constellation point in an n-QAM constellation map; and (b) determining if a prescribed number of constellation points in the constellation map are populated with at least one of the symbols indicating convergence of the equalizer.

In accordance with another aspect of the present invention there is provided a method of detecting misconvergence in an equalizer having a quadrature amplitude modulation (QAM) slicer having an index n, comprising the steps of: (a) processing random symbols through the equalizer wherein the symbols are quantized into an appropriate constellation point in an n-Qam constellation map; (b) determining a number of constellation points in the constellation map that are populated with at least one of the symbols; and (c) comparing the number obtained from step (b) with a predetermined threshold, whereby when the number is less than the prescribed number the equalizer has not converged and when the number is less than or equal to the prescribed number the equalizer has converged.

In accordance with another aspect of the present invention there is provided a method of detecting misconvergence in an equalizer having a quadrature amplitude modulation (QAM) slicer having an index n, comprising the steps of: (a) initializing a plurality of signal counters; (b) processing random symbols through the equalizer wherein the symbols are quantized into an appropriate constellation point in an n-QAM constellation map, where each signal counter corresponds to a respective one of the constellation points in the constellation map; (c) incrementing the signal counters when one of the symbols is quantized to the corresponding constellation point; (d) detecting a number of non-zero counters; (e) determining if the number of non-zero counters is less than a prescribed number, where if the number of non-zero counters is less than the prescribed number the equalizer has not converged and if the number of non-zero counters is equal to or greater than the prescribed number than the equalizer has converged.

BRIEF DESCRIPTION OF THE DRAWINGS

The present invention will be described in conjunction with the drawings in which.

DETAILED DESCRIPTION OF EMBODIMENTS OF THE INVENTION

Figure 1:
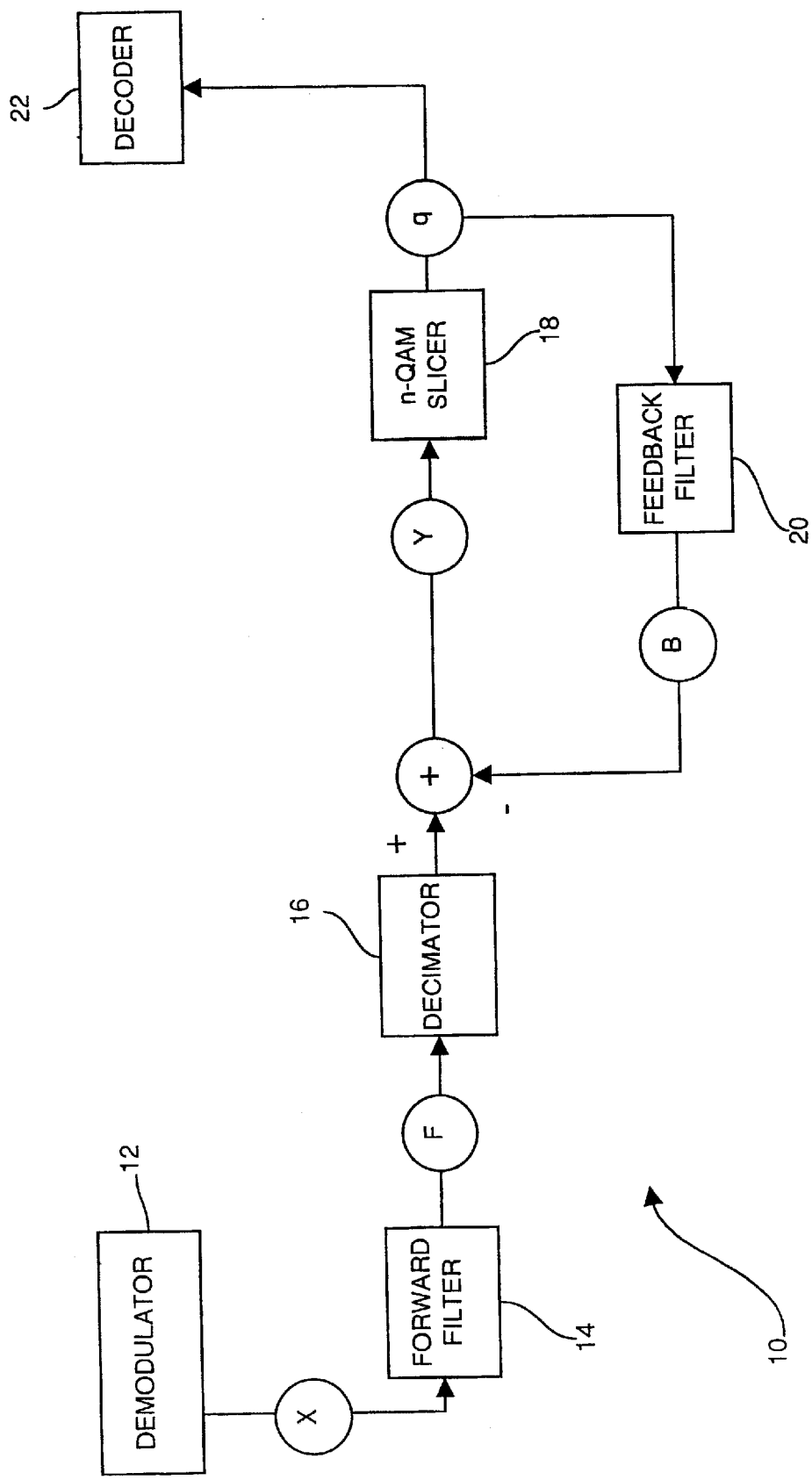
FIG. 1 represents a block diagram of an adaptive decision feedback equalizer.

An equalizer 10, shown in FIG. 1, is used to counteract effects of amplitude and phase distortion introduced by a channel and analog front end of a receiver in a modem. The input X=I+jQ to the equalizer 10 is a complex input taken from the output of Nyquist filters located in a demodulator 12, which is first downsampled by a factor of 2 to provide in-phase (I) and quadrature (Q) datastream signals at twice the symbol rate (symbol rate=inverse of the baud rate of the modem).

The input X is passed through a complex-valued forward filter 14 to produce an output F. The output F of the forward filter 12 is downsampled by decimator 16 by a factor of 2, resulting in a symbol rate data sequence. Quantized output q from an n-QAM slicer 18 is used as input to a complex-valued feedback filter 20 to produce an output B. The output B of the feedback filter 28 is subtracted from the downsampled output (decimated) of the forward filter 14 resulting in an equalized signal Y.

The equalized signal Y is then passed through the n-QAM slicer 18, that quantizes each data sample (for each signal component I and Q of X) to a discrete symbol level in a constellation. The constellation represents a plot of the in-phase (I) component and the quadrature (Q) component of the input signal X on a two dimensional graph for a set of received symbols. The quantized output q of the slicer 18 is also sent to a symbol decoder 22 to recover raw data.

The operation of the forward filter 14 is described by the equation:

$$F(t) = \sum_{i=1}^{M} C_{fi} X(t-i)$$

where F(t) represents the complex-valued output of the filter 14 at time t, X(t) is the complex-valued input to the filter 14 at time t, and $C_{fi}$ are the complex-valued filter coefficients (also termed the tag coefficients) for the filter 14. The complex-valued data F(t) is composed of an in-phase (I) component and an quadrature (Q) component.

The operation of the feedback filter 20 is described by the equation:

$$B(t) = \sum_{i=1}^{N} C_{bi} q(t-1-i)$$

where B(t) represents the output of the filter 20 at time t, $C_{bi}$ are the complex-valued filter coefficients for the filter 20, and q(t) is the quantized output of the slicer 18 at time t.

The slicer 18 accepts the signal Y (representing the I and Q components of the equalized signal) and makes a decision as to which QAM symbol is actually received. In order to quantize the signal to the appropriate level in a constellation, the slicer 18 has a pair of control bits which specify the level of QAM constellation being used.

Under severe conditions of distortion and noise, the decision feedback equalizer 10 converges to filter coefficients ($C_{fi}$, $C_{bi}$) that create pathological sparse constellations for a given QAM index. By scanning the constellation for an appropriate length of time (i.e. process a prescribed number of random symbols) and verifying that most constellation points are present, this condition can be detected and corrected by reconverging.

Figure 2:
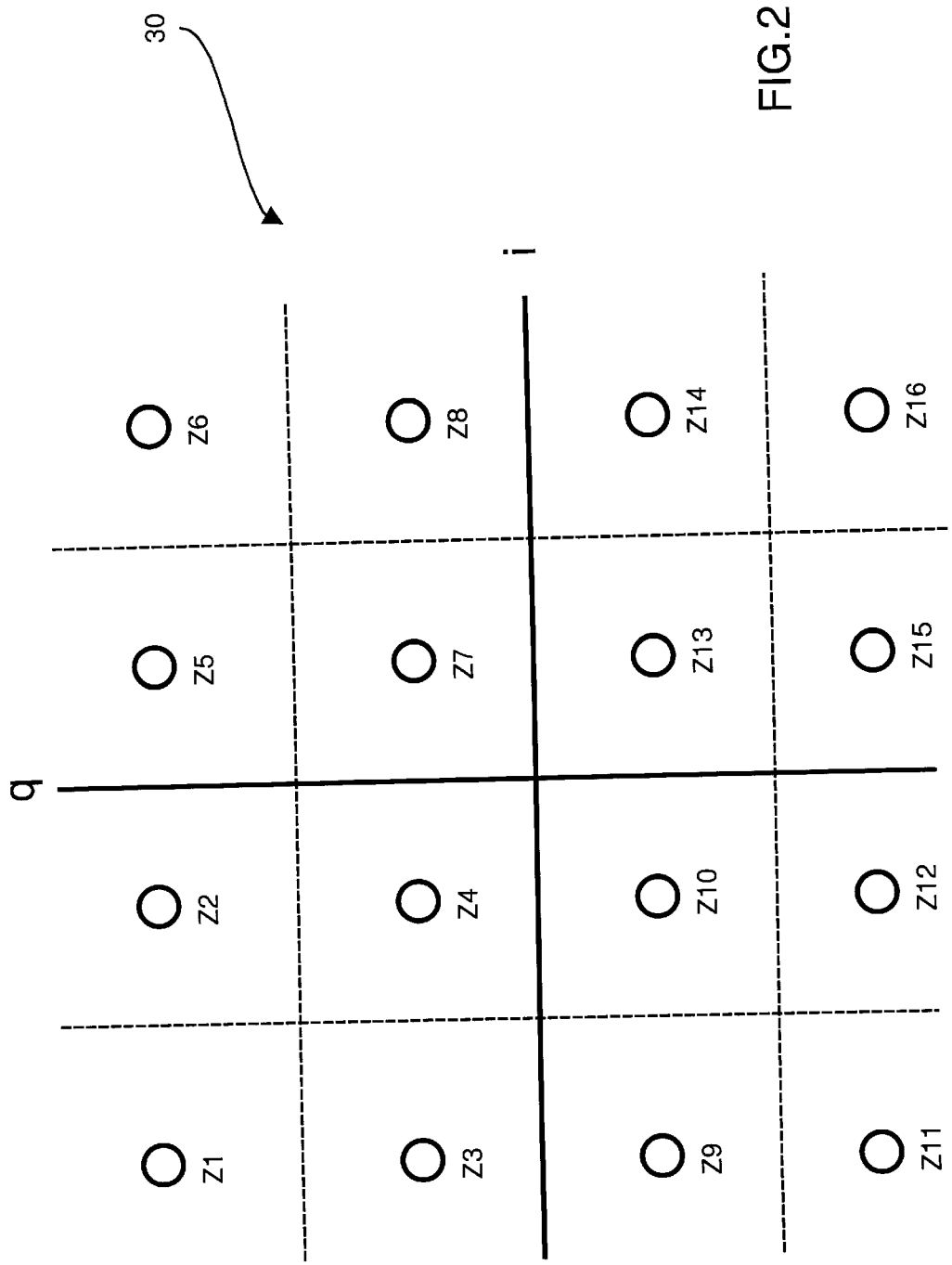
FIG. 2 represents a complete constellation map for a 16QAM system.
Figure 3:
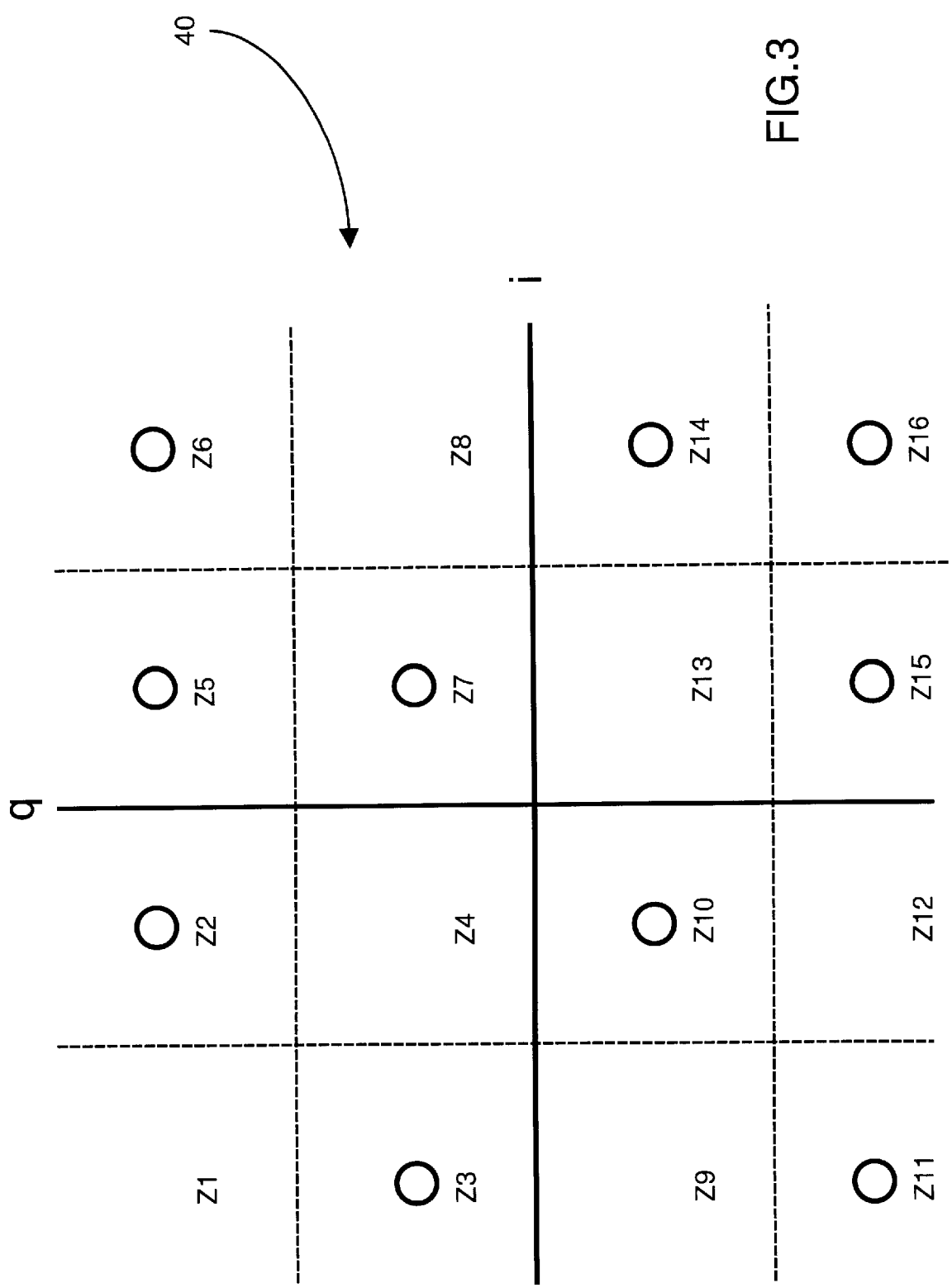
FIG. 3 represents a sparse constellation map for a 16QAM system.

FIG. 2 illustrates a constellation map 30 for a 16QAM system defined by 16 constellation points Z(i), i=1, . . . ,16 properly located in the correct regions of the map 30. FIG. 3 illustrates an example of a sparse 16QAM constellation map 40 where signals are missing from constellation points Z1, Z4, Z8, Z9, Z12, and Z13. The sparse map 40 can occur even if standard convergence detection methods using filter errors (known in the art) indicate that the equalizer 10 has converged.

Figure 4:
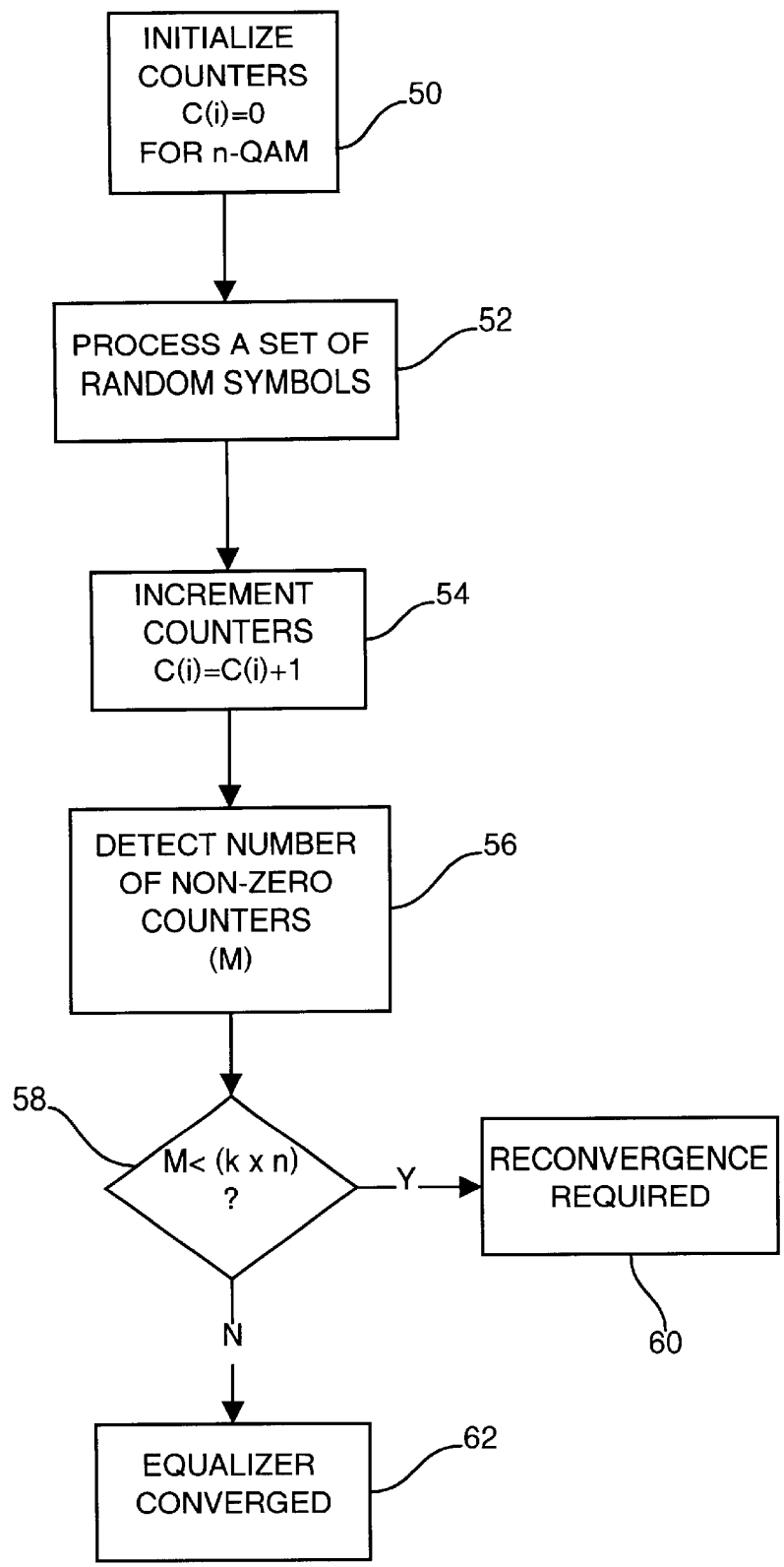
FIG. 4 illustrates a flow chart of the method of constellation scanning according to the present invention.

The method of constellation scanning to detect misconvergence for an n-QAM system according to the present invention will be discussed in conjunction with the flow chart of FIG. 4.

In general, the method of constellation scanning to detect misconvergence in the equalizer 10 involves processing random symbols through the equalizer 10 where the symbols are quantized into an appropriate constellation point in an n-QAM constellation map as shown in FIG. 2. After the prescribed number of symbols have been processed (i.e. mapped to an appropriate constellation point) the method determines if a prescribed number of constellation points in the constellation map are populated with at least one of the symbols indicating convergence of the equalizer 10.

For example, if the equalizer 10 is processing for 16QAM signals (the ideal constellation map 30 shown in FIG. 2) the prescribed number could be set at 11 (i.e. 11 of the 16 (68.75%) constellation points must be populated with at least one symbol). Consequently, if after processing the random symbols the resulting constellation map is representative of map 40 (FIG. 3) which has only 10 populated points, then the method would declare misconvergence.

The following steps are performed to detect misconvergence of the equalizer 10 using constellation scanning:

(1) Initialize a plurality of signal counters C(i)=0(i=1, . . . , n) at step 50, one for each QAM constellation point Z in the equalizer 10.

(2) Process a set of random symbols at step 52 for a given length of time (t) through the equalizer 10 (for example, process between 500 and 20000 symbols). The actual number of symbols depends on the operational QAM index of the equalizer 10 and can be more than 20K for QAM indexes over 256.

(3) Increment counters C(i)=C(i)+1 as the corresponding constellation point Zi appears at step 54. In particular, the slicer 18 accepts the signal Y (representing the I and Q components of the equalized signal Y) and makes a decision as to which QAM constellation point Zi is received. As this decision is made the appropriate counter C(i) is incremented indicating that the constellation point Zi has been populated with at least one symbol.

(4) Determine the number of non-zero counters C(i) at step 56. A variable M is assigned the number of non-zero counters detected at step 56.

(5) A comparison is made at step 58 to determine if M<(k×n). The equalizer 10 has not converged properly if M is less than (k×n), and equalizer reconvergence is directed at step 60. The equalizer 10 has converged to the required accuracy if M is greater than or equal to (k×n) at step 62.

Variable k is an accuracy scaler and is typically between approximately 50% and approximately 90% for most practical QAM systems between 4 and 256 QAM. The time t (a representation of the number of random symbols processed at step 52) can be varied with k depending on the time available and accuracy requirements as illustrated in the examples below.

EXAMPLE 1
LOW ACCURACY EQUALIZER

Variables
QAM index: n=64
Symbol Count: t=1K
Accuracy: k=65%
Number of non-zero counters C(i): M
Convergence Decision
Misconvergence Detected IF:
   M<(k×n)
   M<65/100×64
   M<42

Therefore, at least 42 constellation points Zi (of a possible total of n=64) must be populated with at least one symbol (from the total of 1000 symbols) in order to conclude that the equalizer 10 has converged properly. If there are 22 or more zero symbol constellation points Zi then the equalizer 10 is instructed to reconverge.

EXAMPLE 2
MEDIUM ACCURACY EQUALIZER

Variables
QAM index: n=64
Symbol Count: t=2K
Accuracy: k=75%
Number of non-zero counters C(i): M
Convergence Decision
Misconvergence Detected IF:
   M<(k×n)
   M<75/100×64
   M<48

Therefore, at least 48 constellation points Zi (of a possible total of n=64) must be populated with at least one symbol (from the total of 2000 symbols) in order to conclude that the equalizer 10 has converged properly. If there are 16 or more zero symbol constellation points Zi then the equalizer 10 is instructed to reconverge.

EXAMPLE 3
HIGH ACCURACY EQUALIZER

Variables
QAM index: n=64
Symbol Count: t=4K
Accuracy: k=90%
Number of non-zero counters C(i): M
Convergence Decision
Misconvergence Detected IF:
   M<(k×n)
   M<90/100×64
   M<58

Therefore, at least 58 constellation points Zi (of a possible total of n=64) must be populated with at least one symbol (from the total of 4000 symbols) in order to conclude that the equalizer 10 has converged properly. If there are 6 or more zero symbol constellation points Zi then the equalizer 10 is instructed to reconverge.

What is claimed is:

1. A method of detecting misconvergence in an equalizer having a quadrature amplitude modulation (QAM) slicer having an index n, comprising the steps of:
  (a) processing random symbols through the equalizer wherein the symbols are quantized into an appropriate constellation point in an n-QAM constellation map;
  (b) determining if a prescribed number of constellation points in the constellation map are populated with at least one of the symbols indicating convergence of the equalizer;
  (c) initializing a plurality of signal counters, where each signal counter corresponds to a respective one of the constellation points in the constellation map; and
  (d) incrementing the signal counters when one of the symbols is quantized to the corresponding constellation point.

2. The method of claim 1, where the step of determining includes the step of:
  detecting a number of non-zero counters, where if the number of non-zero counters is less than the prescribed number the equalizer has not converged and if the number of non-zero counters is equal to or greater than the prescribed number than the equalizer has converged.

3. The method of claim 2, where between 500 and 20000 symbols are processed at step (a).

4. The method of claim 3, wherein the prescribed number is less than the QAM index n.

5. The method of claim 4, wherein the prescribed number is between approximately 0.5n and approximately 0.9n.

6. A method of detecting misconvergence in an equalizer having a quadrature amplitude modulation (QAM) slicer having an index n, comprising the steps of:
  (a) initializing a plurality of signal counters;
  (b) processing random symbols through the equalizer wherein the symbols are quantized into an appropriate constellation point in an n-QAM constellation map, where each signal counter corresponds to a respective one of the constellation points in the constellation map;
  (c) incrementing the signal counters when one of the symbols is quantized to the corresponding constellation point;
  (d) detecting a number of non-zero counters;
  (e) determining if the number of non-zero counters is less than a prescribed number, where if the number of non-zero counters is less than the prescribed number the equalizer has not converged and if the number of non-zero counters is equal to or greater than the prescribed number than the equalizer has converged.

7. The method of claim 6, where between 500 and 20000 symbols are processed at step (a).

8. The method of claim 7, wherein the prescribed number is less than the QAM index n.

9. The method of claim 8, wherein the prescribed number is between approximately 0.5n and approximately 0.9n.

10. A method of detecting misconvergence in an equalizer having a quadrature amplitude modulation (QAM) slicer having an index n, comprising the steps of:
  (a) processing random symbols through the equalizer wherein the symbols are quantized into an appropriate constellation point in an n-QAM constellation map;
  (b) determining a number of constellation points in the constellation map that are populated with at least one of the symbols; and (c) comparing the number obtained from step (b) with a predetermined threshold, whereby when the number is less than the prescribed number the equalizer has not converged and when the number is less than or equal to the prescribed number the equalizer has converged.

11. The method of claim 10, where the step of processing includes the steps of:

initializing a plurality of signal counters, where each signal counter corresponds to a respective one of the constellation points in the constellation map; and incrementing the signal counters when one of the symbols is quantized to the corresponding constellation point.

12. The method of claim 11, where the number of step(b) is obtained by:

detecting non-zero counters and adding the detected non-zero counters.

13. The method of claim 12, where between 500 and 20000 symbols are processed at step (a).

14. The method of claim 14, wherein the prescribed number is less than the QAM index n.

15. The method of claim 14, wherein the prescribed number is between approximately 0.5n and approximately 0.9n.

* * * * *